US009246575B2

(12) United States Patent
De Latour et al.

(10) Patent No.: US 9,246,575 B2
(45) Date of Patent: Jan. 26, 2016

(54) METHOD FOR DETECTING AIS MESSAGES (75) Inventors: Antoine De Latour, Toulouse (FR); Michel Faup, Toulouse (FR)

(73) Assignee: CENTRE NATIONAL D'ETUDES SPATIALES (FR)

( * ) Notice: Subject to any disclaimer, the term of this patent is extended or adjusted under 35 U.S.C. 154(b) by 420 days.

(21) Appl. No.: 13/598,011

(22) Filed: Aug. 29, 2012

(65) Prior Publication Data

US 2013/0058271 A1 Mar. 7, 2013

(30) Foreign Application Priority Data

Sep. 5, 2011 (FR) ...................................... 11 57849

(51) Int. Cl.
*H04B 7/185* (2006.01)
*G08G 1/16* (2006.01)

(52) U.S. Cl.
CPC ................... *H04B 7/18508* (2013.01)

(58) Field of Classification Search
CPC .. G08G 3/02; H04B 7/18513; H04B 7/18508; G08B 3/02
See application file for complete search history.

(56) References Cited

U.S. PATENT DOCUMENTS

| 7,876,865 B2 | 1/2011 | Peach | |
| 2008/0079608 A1* | 4/2008 | Morrell | 340/984 |
| 2009/0161797 A1* | 6/2009 | Cowles et al. | 375/324 |
| 2011/0140882 A1* | 6/2011 | Jang | 340/539.13 |
| 2012/0130571 A1* | 5/2012 | Dunkle | 701/21 |
| 2012/0239285 A1* | 9/2012 | Oster | 701/300 |

FOREIGN PATENT DOCUMENTS

WO 2008148188 A1 12/2008

OTHER PUBLICATIONS

Report ITU-R M.2084: "Satellite detection of automatic identification system messages" XP-002674820.
Recommendation IUT-R M.1371-4 (Apr. 2010) and it's annexes, "Technical characteristics for an automatic identification system using time-division multiple access in the VHF maritime mobile band".

* cited by examiner

*Primary Examiner* — Andrew Lai
*Assistant Examiner* — M Mostazir Rahman
(74) *Attorney, Agent, or Firm* — Cantor Colburn LLP (57) ABSTRACT The method for detecting AIS messages involves providing digital data representing signals received by a satellite on at least one AIS channel, and identifying a candidate message in the digital data by correlating the digital data with a hypothetical fragmentary message, the hypothetical fragmentary message includes at least one AIS message fragment which is dependent on transmission time and/or transmitter position and which is determined with the assistance of a database of AIS transmitters.

16 Claims, 5 Drawing Sheets

METHOD FOR DETECTING AIS MESSAGES

TECHNICAL FIELD

The present invention relates to a satellite surveillance system for ships and buoys.

BRIEF DESCRIPTION OF RELATED ART

The automatic identification system, AIS, is a system for exchanging short messages between ships, coastal stations and navigational support systems within a range of 20 to 30 nautical miles (37 to 56 km). AIS uses self-organised time-division multiple access, SOTDMA, in the VHF maritime mobile band. Communication takes place on the channels AIS 1 (centred on 162.975 MHz) or AIS 2 (centred on 162.025 MHz), each with a width of 25 kHz. The exchanged messages have a predefined length and comprise data, such as identification of the ship, her position, her course and her speed.

Each communication channel is time split in frames of 60 s length. Each frame is divided into 2250 slots, each being able to be occupied, in normal operation, by an AIS message (or report). In normal mode, each ship sends out her AIS messages alternatively on the two communication channels. The frequency of the AIS messages from a given ship depends on her speed: if the ship is underway, a message is sent every 2-10 s, the spacing between two consecutive messages being the shorter the higher the speed of the ship; if the ship is stationary, the messages are sent every 3 minutes. The intervals between the messages from the different platforms participating in the system are indicated, for example in the report ITU-R M.2084: "Satellite detection of automatic identification system messages".

The AIS receivers of the ships and the coastal stations receive messages from all ships in the vicinity, thereby allowing them to create a detailed map of the local environment.

Le AIS operates without a central TDMA controller that manages the time division access of the ships. Each AIS transponder monitors the communication channels and in each message reserves the slot that it will use to send the next message. Conflict resolution protocols avoid, in a local geographic zone, message collisions in a same slot.

This is not the case for satellite detection of AIS messages. In fact, the footprint of the antenna(e) of a low-orbiting satellite typically covers a plurality of local geographic zones that in general are not coordinated together. Consequently, the satellite will observe random collisions of messages in the same slot, with the result that one or more of the colliding messages could be lost. The probability of a correct detection and decoding of a given AIS message decreases with an increasing rate of the number of collisions. More detailed information on this subject is provided in the report ITU-R M.2084. This document also indicates possible methods for improving satellite capacity:

The Doppler shifts resulting from the satellite motion depend on the position of the transmitters in the footprint, thereby enabling messages to be discriminated based on the Doppler shift. The Doppler shifts caused by satellite motion can reach ±4 kHz. In this approach, it should nevertheless be borne in mind that the AIS Standard tolerates an error with respect to the carrier frequency of ±500 Hz for the TDMA transmitters of the ships.
  There is an important redundancy of information between two consecutive AIS messages transmitted by a given ship. The report ITI-R M.2084 suggests the continuous transmission by real time download of data received on the two AIS channels with a view to a specific processing in a ground-based station, in particular a continuous correlation of the entering AIS signals with scanned copies of the previously received signals in a time slot that corresponds to the length of one passage of the satellite.

The document U.S. Pat. No. 7,876,865 describes a system and a method for detecting AIS messages in space and decoding them. The AIS signals are digitized and the candidate AIS messages are identified by correlating the digital data with predefined signals that correspond to a code sequence of the AIS message for different Doppler shifts. The message code sequence used for the correlation corresponds to the beginning of the message common to all the AIS messages, i.e. the training sequence of 24 bits and the start flag of 8 bits. In order to improve the detection of candidate AIS messages, the message code sequence used for the correlation can be extended with parts of known messages, such as for example the ship identifier (in this case the MMSI number 10). The document U.S. Pat. No. 7,876,865 therefore sets out the idea from the report ITU-R M.2084 which consists in attempting to redetect messages from transmitters detected shortly before. This approach takes advantage of the fact that a significant number of bits from two consecutive messages from the same ship are the same.

Details of AIS can be found in the Recommendation IUT-R M.1371-4 (April 2010) and its annexes.

BRIEF SUMMARY

The disclosure improves the detection of the AIS messages by satellite, for example to generate a regional or world map of the AIS transmitters.

According to the invention, a method for detecting AIS messages comprises the provision of digital data representing signals received by a satellite on at least one AIS channel, and the identification of a candidate message in the digital data by correlating the digital data with a hypothetical fragmentary message. The hypothetical fragmentary message comprises at least one AIS message fragment which is dependent on transmission time and/or transmitter position and which is determined with the assistance of a database of AIS transmitters.

The method according to the invention is therefore based on a database that contains information on the AIS transmitters. In the first place, this information is used to determine which AIS transmitters are to be found in the footprint of the satellite during its overpass (i.e. at the time of reception of the signals converted into the digital data under consideration). Instead of searching for any AIS message in the digital data— by correlating the digital data with a message fragment common to all the AIS messages (notably the training sequence possibly followed by the start flag)—the invention proposes to search in the digital data for an AIS message from a specific transmitter that is known, from the databank, to be found (or was found—in the case where the data would not be evaluated in real time—) in the zone covered by the satellite at the time when the signals were received. Consequently, the hypothetical fragmentary message comprises message fragments that are predictable with the help of the database and from the trajectory of the satellite (i.e. the position of the satellite as a function of time). For example, each AIS message contains the field "User ID", which unambiguously identifies the transmitter (normally the MMSI number of the ship). By using a fragmented message that comprises the training sequence, the start flag and the field "User ID" for the correlation with the digital data, one can explicitly search for AIS messages that originate from a specific AIS transmitter. It will be appreciated that the correlation peak height relative to the noise increases with the size (number of bits) of the fragmented message. According to the invention, dynamic parts of the candidate message are also predicted. The term "dynamic" part or field is understood here to mean a part of the AIS message that is likely to change from one message to another, for example information on position, navigation, etc. As indicated above, the dynamic part of the hypothetical fragmentary message may comprise at least one fragment of the AIS message that depends on the time of transmission (for example the bits from the fields "time stamp", "UTC year", "UTC month", "UTC day", "UTC hour", "UTC minute" and/or "UTC second" fields) and/or of the position of the transmitter (for example the bits from the fields "longitude" and/or "latitude"). The descriptions of the various AIS message fields are found in the Recommendation ITU-R M.1371-4 (April 2010) and its annexes.

According to one preferred embodiment of the inventive method, the hypothetical fragmentary message comprises at least one AIS message fragment that depends on the position of the transmitter. The composition of this message fragment includes:

the identification, on the basis of the database of AIS transmitters, of an AIS transmitter located in a zone served by the satellite when the signals are received; and the determination of the at least one AIS message fragment which is dependent on transmitter position on the basis of a position, stored in the database, of the identified transmitter.

The at least one AIS message fragment which is dependent on transmitter position preferably comprises the most significant bits from the "longitude" field and/or the most significant bits from the "latitude" field. It is assumed here that between two consecutive observations of the same ship, the ship's position is at least roughly the same. The new position of a ship can be predicted in a circle about its last known position and corresponds to the product of the maximum speed of the ship and the time passed since the last message. The prediction can be still more accurate if other parameters, such as for example the ship's destination, her last heading, her last speed, her last navigational status, etc. are known (i.e. stored in the databank). Given that a transmitter sends its AIS messages every 2 to 10 s, the estimation of the position will be very precise for AIS messages received during the same overpass of the satellite. A transmitter can remain unobserved for some hours (e.g. 1 to 2 h) between two overpasses of the satellite. The more precise the estimated position, the more most significant bits of the fields "longitude" and "latitude" will be known.

The digital data are preferably time-stamped (e.g. by the satellite). The at least one AIS message fragment that depends on the time of transmission can then be determined based on the time stamp of the digital data. The at least one AIS message fragment that depends on the transmission time can notably comprise bits from the "time stamp" field or bits from the "UTC year", "UTC month", "UTC day", "UTC hour", "UTC minute" and/or "UTC second" fields.

The hypothetical fragmentary message advantageously comprises bits from one or more static fields specific to the transmitter identified in the database. The term "static" field is understood to mean here a field, whose content does not change from one message to another for a given AIS transmitter. Exemplary static fields are the "user ID" field (containing the MMSI number), the "AIS version indicator" field, the "IMO number" field (the International Maritime Organisation number), the "call sign" field, the "name" field (name of the ship), the "type of ship and cargo type" field, the "overall dimensions/reference for position" field, the "type of electronic position fixing device" field.

Apart from the fragment(s) that depend on the time of transmission or on the position of the transmitter, the hypothetical fragmentary message may comprise bits from one or more dynamic fields specific to the transmitter identified in the database, for example the "RAIM flag" field (receiver autonomous integrity monitoring), the "special manoeuvre indicator" field, the "estimated time of arrival" field, the "current draught" field, the "destination" field, the "navigational status" field, the "course over ground" field, the "speed over ground" field, and/or the "communication status" field.

Preferably, once a candidate message has been identified in the digital data, the candidate message is decoded, and the information contained in the decoded message is used to update the database of AIS transmitters.

The candidate message is preferably identified by correlating the digital data with a plurality of hypothetical fragmentary messages. In fact, it may be necessary to test several hypotheses in order to identify the candidate message, notably if the signal specific to the message is very weak or noisy. One reason is that the predictable fragments of the candidate message can be separated by gaps. In principle the length of the gaps is known, because the AIS Standard defines nominal fixed lengths of field. However, the field length can vary if stuffing bits have to be inserted in order to avoid the occurrence of a bit sequence that is identical to the start or end flags. As it is a priori unknown if the gaps (the unknown parts of the candidate message) comprise stuffing bits, the plurality of hypothetical fragmentary messages can be designed so as to test for the presence or absence of stuffing bits in the candidate message. The correlations corresponding to different hypothetical fragmentary messages can be calculated in series and/or in parallel.

The position of the satellite when the signals are received can be obtained in several ways. For example, the satellite can be equipped with a positioning system (GPS, Doris, Galileo, Glonass, Compass or other) and thus link the digital data to the satellite trajectory data. Another possibility is to obtain the satellite trajectory data by a satellite control centre (TT&C centre: telemetry, tracking and command) or a surveillance network using e.g. a laser ranging system. Yet another possibility is for the position of the satellite when the signals are received to be estimated by triangulation (by reading the distances) relative to transmitters for which one or more AIS messages are identified in the digital data. The satellite trajectory can therefore be reconstructed, based on the AIS messages it receives.

In order to correlate the digital data with the hypothetical fragmentary message, the start of the hypothetical fragmentary message is preferably synchronised with a start of a time interval of the AIS time frame. As the digital data are time stamped, and the AIS frames are synchronised with the UTC time, the temporal uncertainty range is reduced to the synchronisation jitter of the AIS (±312 µs corresponding to ±3 bits) plus a certain buffer to compensate for the uncertainty in the position of the ship. All in all, it can be assumed that the temporal uncertainty range is ±6 bits with respect to the UTC time.

For the purpose of correlating the digital data with the hypothetical fragmentary message, a calculated Doppler shift for the hypothetical fragmentary message is preferably compensated as a function of transmitter position. The Doppler shift of an AIS message depends on the relative speed between the satellite and the message transmitter. As the speed of the AIS transmitter can be neglected in the terrestrial reference frame, the Doppler shift can be expressed as a function of the position of the transmitter in the referential frame of the satellite. For a low orbit satellite, the Doppler shift will be comprised in an interval of ±4.5 kHz. Given that the position of the transmitter is known to at least the nearest 100 km (radius of about 100 km about the last detected position) and that the satellite trajectory is also known, the Doppler shift uncertainty will be less than 500 Hz. However, for a low height (the angle between the target direction and the horizontal) of the satellite, the Doppler shift uncertainty will normally be of the order of ±100 Hz.

However, as the AIS Standard tolerates an error relative to the transmitter carrier frequency of ±500 Hz, the total uncertainty in the range of frequencies is ±1000 Hz (uncertainty of the Doppler shift plus the error relative to the carrier frequency). For a given AIS transmitter, the error relative to the carrier frequency is normally essentially constant over time. This error is therefore advantageously stored in the database in order to be able to take it into account for the search in the range of the frequencies. For an AIS transmitter, whose error relative to the carrier frequency can be extracted from the database, the uncertainty in the range of frequencies will therefore be solely that of the Doppler shift (±100 Hz). If the error relative to the carrier frequency of a given AIS transmitter has not yet been saved in the database, then it can be calculated from the frequency, at which the correlation peak is detected and from the theoretical Doppler shift (obtained by using the position of the satellite and of the transmitter), and by storing it in the database for future use.

Finally, for the purpose of correlating the digital data with the hypothetical fragmentary message, account is preferably likewise taken of the AIS transmitter modulation index stored in the database. To search for a message of a specific AIS transmitter, it is advantageous to know its modulation index (nominal value for AIS: 0.5). If the modulation index is a priori unknown, the correlation can therefore be made for a plurality of hypotheses for the modulation index (e.g. in the range 0.5±0.1); the value of the modulation index that maximised the correlation being stored in the database.

A further aspect of the invention relates to a computer programme that comprises computer-executable instructions that when executed by a computer, cause the computer to carry out the method described above. Yet another aspect of the invention relates to a computer programme product, comprising a data storage medium (e.g. a random access memory or a read-only memory, a CD-ROM, a USB key, a hard disk, etc.) containing the programme instructions.

BRIEF DESCRIPTION OF THE DRAWINGS

Other characteristics and features of the invention will become apparent from the detailed description of some advantageous exemplary embodiments given below, for illustration, with reference to the accompanying drawings. They show.

DETAILED DESCRIPTION

Figure 1:
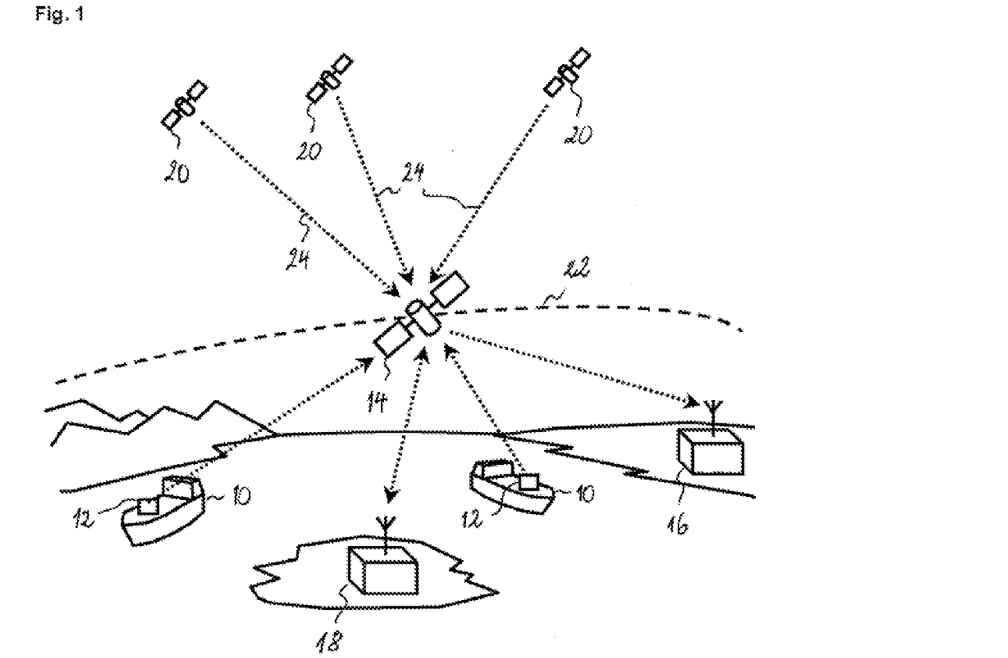
FIG. 1: is a general outline of a satellite detection system for AIS messages.

FIG. 1 shows the general outline of a satellite detection system for AIS messages; The ships 10, each equipped with an AIS transceiver 12, transmit AIS messages containing data such as the identification of the ship (MMSI number), the localisation in WGS 84 coordinates (world geodetic system, 1984 revision), the heading, the speed and other status information. The messages are received by the AIS receivers of the ships and the coastal stations in the vicinity. Each ship 10 can thus create a detailed map of the AIS transmitters in her local environment (within a radius of about 20 to 30 nautical miles), which complements the information supplied by radars and other navigational aids.

The AIS messages can also be received by the (LEO) satellites 14 in low earth orbit, i.e. which are found at an altitude between 160 and 2000 km. The footprint of an antenna of a low orbit satellite typically covers a geographic zone, whose dimensions greatly exceed those of the cells in which the AIS avoids the collisions of messages. As the cells are not generally coordinated between them, the AIS signals received by the satellite will be able to contain messages that overlap in time and frequency. The problem arises particularly in zones in which the shipping density is high.

The AIS channels 1 (centred on 162.975 MHz) or AIS 2 (centred on 162.025 MHz), hereinafter called AIS signals, are received by the satellite 14 and digitised. The thus-obtained digital data are time stamped and transmitted to one or more ground stations 16 over a downlink. It should be noted that the ship surveillance system can comprise a plurality of LEO satellites and a plurality of ground stations. The LEO satellite(s) are controlled by one or more satellite control centres 18. For reasons of clarity, we will refer below to one LEO satellite. If a plurality of satellites are used, the data processing by the various satellites is preferably carried out in parallel.

The LEO satellite 14 is preferably equipped with a geopositioning system, for example a GPS receiver. The satellite can then determine its position by means of radio navigation signals 24 originating from GNSS satellites 20. The digital data representing the AIS signals can then be bijectively linked to the trajectory 22 of the LEO satellite: each data sequence can be unequivocally attributed to one instant and to one position of the LEO satellite.

Figure 2:
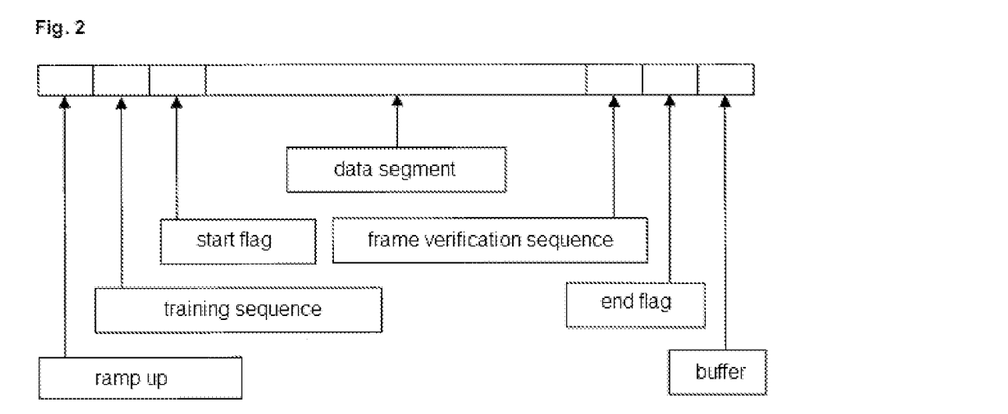
FIG. 2: is an illustration of the structure of an AIS message.

FIG. 2 is an illustration of the structure of an AIS message. Each AIS message contains 256 bits and is subdivided into a ramp up field (8 bits), a training sequence (24 bits), a message start flag (8 bits), a data sequence (168 bits), a cyclic redundancy check (16 bits), a message end flag (8 bits) and a buffer (24 bits). The Recommendation ITU-R M.1371.4 mentions a start buffer as well as an end buffer. In this document these two fields are treated as one.

The data sequence of an AIS message is also subdivided into several fields of defined length. The structure of the data sequence and the transmitted fields depend on the type of message. It should be noted that each AIS message contains bit sequences that are common to all AIS messages, e.g. the ramp up field, the training sequence, the start flag and the end flag. If only a certain type of AIS message is considered, the field "ID message" is also known. The other bit sequences are specific to the transmitter. Among these, one can also distinguish between "static" bit sequences that are specific to transmitters that are programmed for an indefinite period in the transmitter, and "dynamic" bit sequences specific to transmitters which may change from one message to another.

The table below indicates the "static" bit sequences specific to transmitters:

| Field name | Number of bits |
| --- | --- |
| ID user | 30 |
| AIS version indicator | 2 |
| IMO number | 30 |
| Call sign | 42 |
| Name | 120 |
| Type of ship and cargo | 8 |
| Overall dimensions/reference for position | 30 |
| Type of electronic device for determination of position | 4 |

Figure 3:
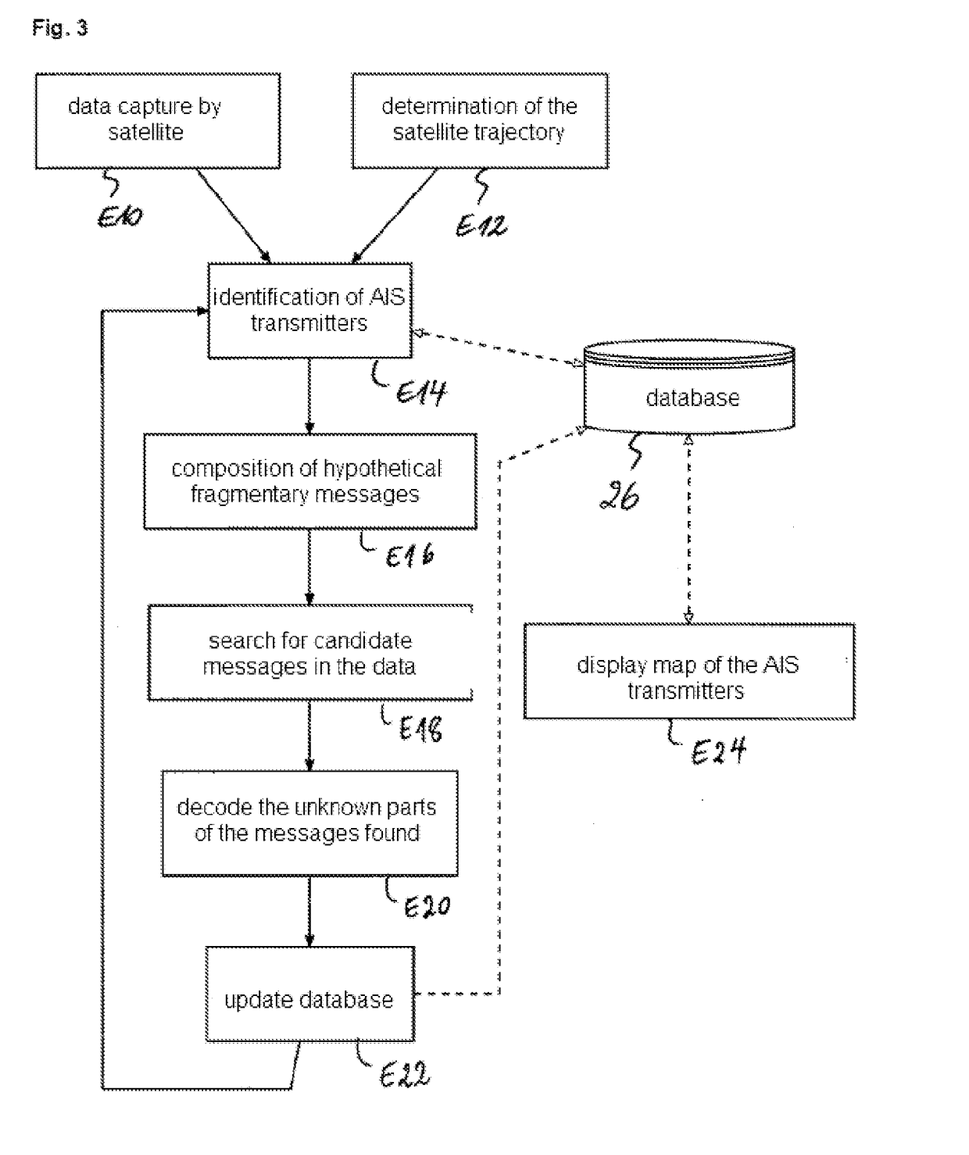
FIG. 3: is a schematic drawing illustrating the principles of a method of detection of AIS messages according to a first embodiment of the invention.

FIG. 3 shows the scheme of the principle for the inventive method according to a first preferred embodiment. The invention takes advantage of the fact that a certain number of bits of the data sequence of an AIS message can be predicted if the AIS transmitter that transmitted the message is known and if, moreover, certain supplementary information about this transmitter is available, notably its position. The predictable bits particularly comprise the bits of the "static" fields specific to the transmitter, because it suffices to save the contents of these fields in a database of AIS transmitters. Other predictable bits are certain bits of the "dynamic" fields that are specific to the transmitter, such as for example, the most significant bits of the fields "longitude" and "latitude"—on condition, however, that the position of the transmitter in question is located at a sufficiently high rhythm such that the transmitter is not lost from sight.

The data is captured (step E10) at the level of the LEO satellite, as described above. The time stamped digital data are transmitted to a data centre that can be in a ground station 16 with a direct link to the satellite 14 or to another location that is in communication with the ground station 16.

In order to detect the AIS messages, the digital data originating (directly or indirectly) from the LEO satellite(s) are normally correlated with the training sequence. As this sequence is quite short it will not enable a correlation peak, and hence a candidate message, to be detected, in the presence of a noisy signal. To be able to predict a greater number of bits of the AIS messages which are still undetected in the digital data, those AIS transmitters are identified which could have transmitted an AIS message in the zone covered by the satellite at the time of its overpass.

To do this, firstly the trajectory of the satellite (step E12) has to be determined. The trajectory (i.e. the position as a function of time) is preferably calculated at the level of the satellite, e.g. with the help of a positioning system. In this case, the data concerning the satellite trajectory can be transmitted to the data centre over the same communication link as the AIS signal data. Alternatively, the data centre can receive the LEO trajectory data from a satellite control centre 18 (TT&C centre), via any communication link.

To identify those AIS transmitters that could have transmitted an AIS message contained in the digital data (step E14), the position of the satellite is determined at the time of reception of the AIS signals. The database of the AIS transmitters 26 is then consulted which shows those AIS transmitters, whose last position saved in the database 26 was in a predefined zone about the satellite position. This predefined zone can include the footprint of the antenna or antennae of the satellite and possibly a peripheral zone. This peripheral zone takes into account those ships, whose last position, saved in the database, was outside the footprint but sufficiently close to it, such that the ship would have been able to enter it in the time that has passed since the position had been detected.

For each AIS transmitter that could have transmitted an AIS message contained in the digital data, one or a plurality of hypothetical fragmentary messages are composed which contain the bits that can be predicted, based on the information contained in the database 26 (step E16). A search for the candidate messages in the digital data is then carried out by correlating them with the hypothetical fragmentary messages (step E18). These steps will be described in more detail below.

Once a candidate message has been identified in the digital data, its unknown parts are decoded (step E20) (i.e. the bit sequences that could not be predicted with sufficient certainty). The unknown parts can be decoded by known techniques, e.g. with the help of the Viterbi algorithm). The information contained in the decoded messages is then used to update the database 26 (step E22).

The method continues with the next digital data. As the position of the satellite changes, the new AIS transmitters are identified that enter into the satellite footprint, and those that leave.

Subscribers to the database can access it, and can obtain in particular a display of a map of the AIS transmitters (step E24).

When an AIS transmitter leaves the footprint of the satellite, it remains unobserved until the next overpass of the same or another satellite of the satellite detection system of AIS messages. For a constellation of four LEO satellites, local inobservation times can be of the order of 2 hours. That means that the data saved for a transmitter that enters into the footprint of a satellite are 2 hours old on average. This period is preferably taken into account when composing the hypothetical fragmentary messages. A plurality of hypotheses may possibly be required in order to identify a candidate message in the digital data. These hypotheses can be tested in parallel and/or in series. When choosing to test in series, one should start with the most probable hypothesis and if the detection fails, continue with the following hypotheses in the order of decreasing probability.

For example, for a given AIS transmitter, whose last navigational state saved in the database indicated that the transmitter was mobile, one would preferably try to detect a type 1 AIS message; the hypothetical fragmentary message to correlate with the digital data would be configured appropriately. In the case of a failure (i.e. no correlation peak is detected), one can try to detect a type 3 AIS message from the same transmitter with the same hypothesis of time and frequency. When looking for an AIS transmitter, whose last navigational state saved in the database indicated that the transmitter was immobile, then one would initially try rather to detect a type 3 AIS message. In the case of a failure, one can try to detect a type 1 AIS message from the same transmitter with the same hypothesis of time and frequency. In parallel, one preferably tries to detect type 5 messages from all transmitters thought to be present in the covered geographical zone.

The following table indicates the predictable bits for the type 1, 2 or 3 AIS messages. In general, the number of predictable bits depends on the complexity of the model used for the prediction, and on the freshness of the database at the time of prediction. In general, the bits of the "static" fields specific to the transmitter can all be predicted. In contrast, for the "dynamic" fields specific to the transmitter which may change from one message to another, the freshness of the database determines how many of the bits of these fields can be predicted.

| Field | Number of bits | Number of known bits |
|---|---|---|
| Ramp up | 8 | 8 |
| training sequence | 24 | 24 |
| start flag | 8 | 8 |
| Start of the data sequence | | |
| ID message | 6 | 6, if a certain type of message is searched for |
| Repeat indicator | 2 | 2 (default value = 0) |
| ID user | 30 | 30 |
| Navigational status | 4 | 1 (the most significant bit is known if one supposes that the navigational status is <8, which is the case for an immobilised ship) |
| Rate of turn ROT$_{AIS}$ | 8 | 0-8, depending on the model and the freshness of the database |
| Speed over ground | 10 | 0-10, depending on the model and the freshness of the database 7 for an immobilised ship, as the speed <1 knot |
| Position accuracy | 1 | 0-1, depending on the model and the freshness of the database |
| Longitude | 28 | 9 for a prediction of the position with an uncertainty of 100 km (most unfavourable case); 23 for a prediction of the position with an uncertainty of 10 m |
| Latitude | 27 | 8 for a prediction of the position with an uncertainty of 100 km (most unfavourable case); 22 for a prediction of the position with an uncertainty of 10 m |
| Course over ground | 12 | 0-12, depending on the model and the freshness of the database 12 for an immobilised ship |
| True heading | 9 | 0-9, depending on the model and the freshness of the database |
| Time stamp | 6 | 6 (thanks to the time stamp of the digital data with a precision of 1 ms) |
| Special manoeuvre indicator | 2 | 0-2, depending on the model and the freshness of the database |
| Spare | 3 | 3 (default value) |
| RAIM flag | 1 | 0-1, depending on the model and the freshness of the database |
| Communication state | 19 | 19 for an immobilised ship (communication state SOTDMA); 19 for the sub-messages 1, 2, 4 and 6; 0-19 for the sub-messages 0, 3, 5 and 7 (depending on the model and freshness of the database—the model in this case must be able to estimate the number of ships in the vicinity) |
| End of the data sequence | | |
| Frame check sequence | 16 | 0 |
| End flag | 8 | 8 |
| Buffer | 24 | 0 |

Figure 4:
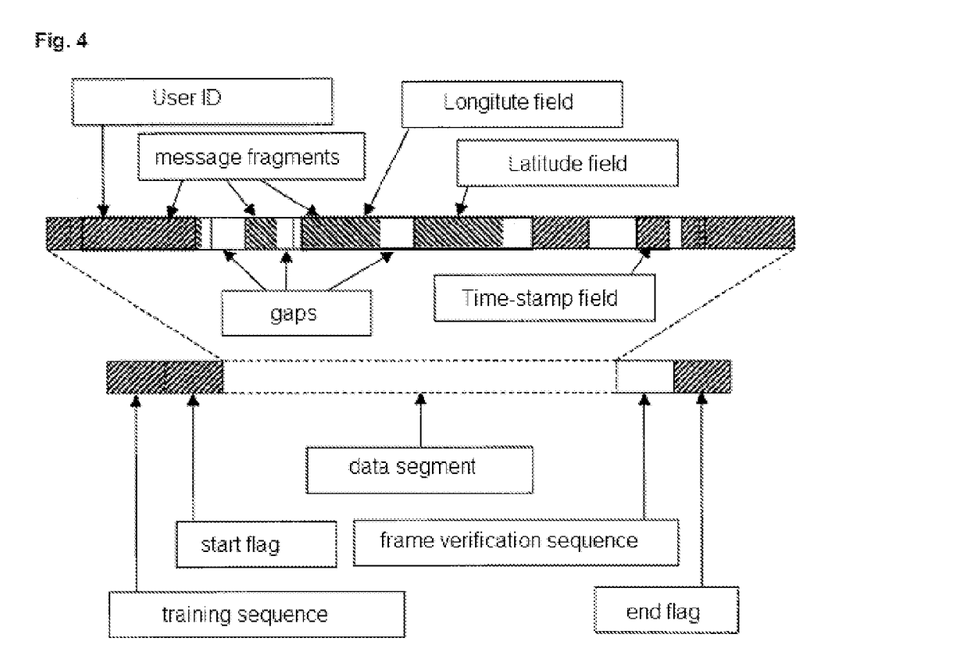
FIG. 4: is an illustration of a hypothetical fragmentary message for detecting an AIS message.

FIG. 4 is an illustration of a hypothetical fragmentary message for detecting a type 1 AIS message from an immobilised ship (anchored or moored), whose AIS transmitter is in the communication state SOTDMA. The predictable bit sequences (message fragments) are hatched. It should be noted that the predictable bit sequences can extend over several fields. For certain fields, for example the "longitude" and "latitude" fields, only a part of the bits are predictable with sufficient certainty.

The following table indicates the predictable bits for the type 4 AIS messages (transmitted by fixed base stations):

| Field | Number of bits | Number of known bits |
|---|---|---|
| Ramp up | 8 | 8 |
| training sequence | 24 | 24 |
| start flag | 8 | 8 |
| Start of the data sequence | | |
| ID message | 6 | 6, if a type 4 message is searched for |
| Repeat indicator | 2 | 2 (default value = 0) |
| ID user | 30 | 30 |
| Year UTC | 14 | 14 |
| Month UTC | 4 | 4 |
| Day UTC | 5 | 5 |
| Hour UTC | 5 | 5 |
| Minute UTC | 6 | 6 |
| Second UTC | 6 | 6 |
| Position accuracy | 1 | 0-1 depending on the model and the freshness of the database |
| Longitude | 28 | 23 for a prediction of the position with an uncertainty of 10 m |
| Latitude | 27 | 22 for a prediction of the position with an uncertainty of 10 m |
| Type of electronic position fixing device | 4 | 4 |
| Transmission control for long-range broadcast message | 1 | 1 (if default value is assumed) |
| Spare | 9 | 9 |
| RAIM flag | 1 | 0-1, depending on the model and the freshness of the database |
| Communication state | 19 | 0-19, depending on the model and the freshness of the database |
| End of the data sequence | | |
| Frame check sequence | 16 | 0 |
| End flag | 8 | 8 |
| Buffer | 24 | 0 |

The following table indicates the predictable bits for type 5 AIS messages (which extend over two consecutive slots in an AIS frame):

| Field | Number of bits | Number of known bits |
|---|---|---|
| Ramp up | 8 | 8 |
| training sequence | 24 | 24 |
| start flag | 8 | 8 |
| Start of the data sequence | | |
| ID message | 6 | 6, if a type 5 message is searched for |
| Repeat indicator | 2 | 2 (default value = 0) |
| ID user | 30 | 30 |
| IMO number | 30 | 30 |
| Call sign | 42 | 42 |
| Name | 120 | 120 |
| Type of ship and cargo | 8 | 8 |
| Overall dimensions/reference for position | 30 | 30 |
| Type of electronic position fixing device | 4 | 4 |
| Estimated time of arrival | 20 | 0-20, depending on the model and the freshness of the database, 9 if the year, month and day of arrival are known, >9 if the hour of arrival is also known |

-continued

| Field | Number of bits | Number of known bits |
|---|---|---|
| Maximum present station draught | 8 | 0-8, depending on the model and the freshness of the database |
| Destination | 120 | 120 (except when the destination is changed) |
| Data terminal equipment | 1 | 0-1, depending on the model and the freshness of the database |
| Spare | 1 | 1 |
| End of the data sequence | | |
| Frame check sequence | 16 | 0 |
| End flag | 8 | 8 |
| Buffer | 24 | 0 |

The following table indicates the predictable bits for type 21 AIS messages (broadcast by a navigational aid station: extends over two consecutive slots in an AIS frame):

| Field | Number of bits | Number of known bits |
|---|---|---|
| Ramp up | 8 | 8 |
| training sequence | 24 | 24 |
| start flag | 8 | 8 |
| Start of the data sequence | | |
| ID message | 6 | 6, if a type 21 message is searched for |
| Repeat indicator | 2 | 2 (default value = 0) |
| ID user | 30 | 30 |
| Type of navigational aid | 120 | 120 |
| Longitude | 28 | 23 (precision of 10 m) |
| Latitude | 27 | 22 (precision of 10 m) |
| Dimension/reference for the position: | 30 | 30 |
| Type of electronic position fixing device | 4 | 4 |
| Time stamp | 6 | 6 |
| Out of position indicator | 1 | 0-1, depending on the model and the freshness of the database |
| Status navigational aid | 8 | 0-8, depending on the model and the freshness of the database |
| RAIM flag | 1 | 0-1, depending on the model and the freshness of the database |
| Assigned mode flag | 1 | 0-1, depending on the model and the freshness of the database |
| Spare | 1 | 1 |
| Name of the navigation aid extension | 0, 6, 12, 18, 30, 24, 36, ..., 84 | 0, 6, 12, 18, 24, 30, 36, ..., 84 |
| End of the data sequence | | |
| Frame check sequence | 16 | 0 |
| End flag | 8 | 8 |
| Buffer | 24 | 0 |

Thus, each AIS message begins with a sequence of predictable bits if the AIS transmitter is known. This sequence of bits, representing a first fragment of the hypothetical fragmentary message, contains in particular the fields "training sequence", "start flag", "ID message", "repeat indicator" and "ID user", i.e. at least 70 bits. Depending on the type of message to be identified, this first message fragment can be significantly longer (110 bits for a type 4 message, 306 bits for a type 5 message).

In the above tables, no account was taken for possible stuffing bits. In each AIS message, in order to avoid the occurrence of a bit sequence identical to the end message flag (i.e. the bit sequence [01111110]), stuffing bits are automatically inserted into the data sequence and into the frame check sequence. On the AIS transmitter's side, this means that if five consecutive 1's are found in the output bit stream, a zero is inserted after these five consecutive 1's. On the receiving side, the first zero after five consecutive 1's has to be removed. The stuffing bits can lengthen the known parts of the message to be detected but also its unknown parts. In order to take the possible different cases into account, the lengths of the gaps (the unknown parts) must therefore be varied within the hypothetical fragmentary messages that are correlated with the digital data.

Figure 5:
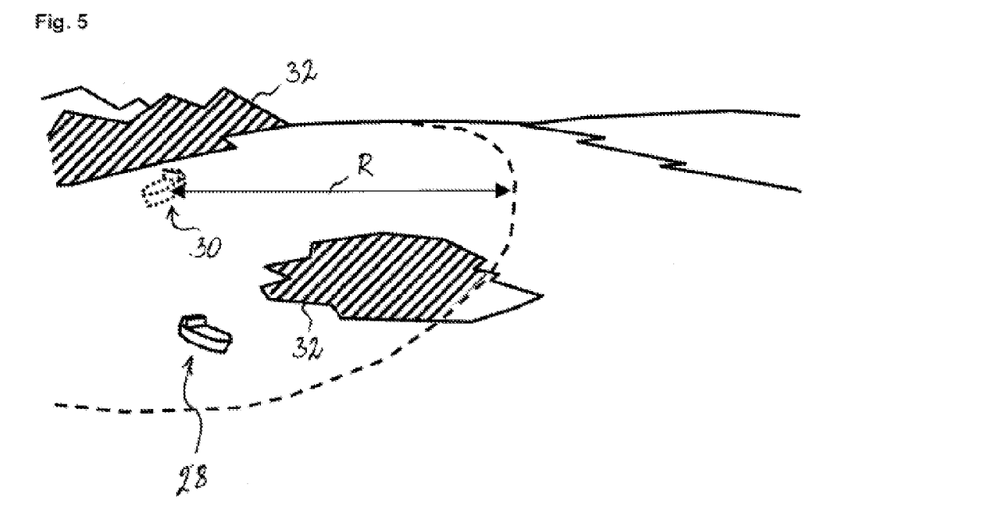
FIG. 5: is an illustration of the principle for the prediction of the new position of a ship.

The hypothetical fragmentary messages contain at least one message fragment that depends on the time of transmission (for example the field "time stamp" of the type 1, 2, 3 or 21 messages) and/or on the position of the AIS transmitter (for example the fields "longitude" and "latitude" of the type 1, 2, 3, 4 and 21 messages). In order to estimate (predict) the bits of the message fragments that depend on the position of the transmitter, one has to take into account the last known position (i.e. saved in the database) of the AIS transmitter in question. Several scenarios are possible. Advantageously, one assumes that the navigational state has not changed between the last decoded AIS message from a specific transmitter and an AIS message to be identified from the same transmitter. This hypothesis is certainly not true in all cases, but it is very probable for the unobserved time under consideration (several hours at most). Thus, if the database indicates that the ship is anchored or moored, the fragmentary message will be composed, based on the hypothesis that the position of the ship remains the same (within 10 m). If a correlation peak cannot be detected then it will be assumed that the ship has got underway. This hypothesis will be the first to be tested if the last navigational state indicates that the ship is underway. In this case, illustrated in FIG. 5, the new a priori unknown position of the ship 28 must be found inside a circle around the last known position 30, wherein the radius R of the circle is the product of the time $\Delta T$ since the last decoded AIS message and the maximum speed $v_{max}$ of the ship: $R = \Delta T \cdot v_{max}$. The maximum speed of the ship can be found in the database (if it has been stored there). If the maximum speed is unknown, it can be assumed to be lower than a given threshold value (e.g. 50 km/h). The areas of land 32 found inside the circle can be neglected. (However, if the ship in question is a riverboat, obviously the navigable waterways must not be excluded.) For an accuracy of the new position for R=100 km, 9, respectively 8 bits of the fields "longitude" and "latitude" can be predicted. The accuracy of the prediction can be improved if additional information on the ship is available in the database, in particular the fields "type of ship and cargo type", "estimated time of arrival" and "destination" of the type 5 message. For example, if the ship in question is known to be a ferry, whose past routes are known, then the ship can probably be found on one of these routes, thereby strongly decreasing the zone of uncertainty of the position. If the estimated time of arrival and the destination port are known, then this also allows predictions to be made on the route taken by the ship.

A preferred implementation of the search step for candidate messages in the digital data (step E18) will now be described in more detail. It should be noted that the digital data are uniquely correlated with the segments of predicted bits (message fragments). The unknown bits (the gaps between the different message fragments) are not correlated with the digital data of the AIS signals. Thanks to the synchronisation of the digital data with the UTC time and to the at least approximate knowledge of the position of the AIS transmitters, one can calculate the propagation delay of the AIS messages from each transmitter. As each AIS transmitter synchronises (directly or indirectly) its messages to UTC time, then by taking into account the propagation delay one knows the instants at which the AIS messages can begin from a given transmitter with a precision of ±6 bits (temporal uncertainty range). The temporal uncertainty range is made up of the synchronisation jitter of the AIS (±312 µs corresponding to ±3 bits) plus a certain buffer to compensate for the uncertainty in the position of the ship. For the correlations, the temporal search range corresponds to the temporal uncertainty range (i.e. 12 bits). The correlations are carried out at the beginning of each time-slot of the AIS frame.

In order to take into consideration the Doppler effect and the error relative to the carrier frequency of the transmitter, the correlation method is carried out over a search frequency range around the carrier frequency. If one searches for an AIS message from a transmitter, whose error relative to the carrier frequency is contained in the database, then this error can be compensated for, and the uncertainty in the residual domain of frequencies is solely that of the Doppler shift (normally ±100 Hz). The frequency search interval will therefore be typically 200 Hz wide.

By varying the delay between the hypothetical fragmentary message and the digital data between each integration of a half bit, each correlation operation will contain 24 integrations. Dividing the frequency search interval into 8 cells (of 25 Hz width) yields a total of 192 integrations per cell in the time/frequency search space (not counting the different hypotheses for the modulation index, see below). It should be noted that the width of the cells in frequency is preferably chosen such that the principal correlation peak can be detected without ambiguity on the frequency axis.

Once the shift with respect to the carrier frequency has been found, the theoretical Doppler shift can be subtracted. The residual error can be used to correct the error relative to the carrier frequency saved in the database.

Figure 6:
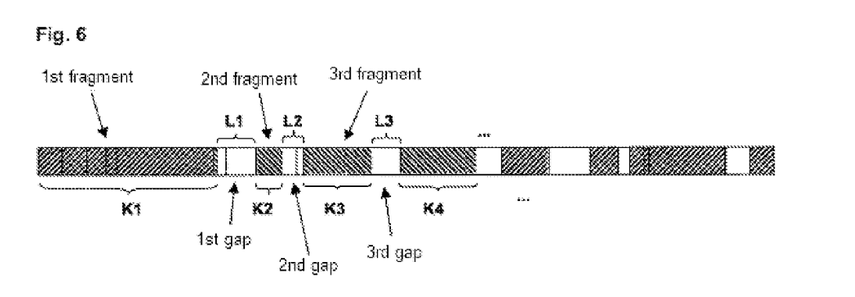
FIG. 6: is an illustration of the message fragments (known bits) and the gaps (a priori unknown bits) of a hypothetical fragmentary message.

The correlation method, for one modulation index hypothesis for each cell of the time/frequency search space, preferably comprises the following steps:

a. Correlation of the digital data with the first message fragment (having K1 known bits, see FIG. 6) by using the two possible phases (NRZI encoded data). Two correlation results are obtained from step a.

b. Correlation of the digital data with the second message fragment (having K2 known bits). To take into account possible stuffing bits in the first gap (the unknown bits between the first and the second fragment), the beginning of the correlation must be positioned at different distances from the first fragment. The number of unknown bits of the first gap is known (L1). The length of the first gap will therefore be L1 plus the number of stuffing bits. As the latter is unknown, different possible gap lengths have to be tried (L1, L1+1, . . . , L1+B1, where B1 is the maximum number of stuffing bits in a sequence of L1 bits). Each correlation has also to be carried out for the two possible phases in order to take into account the NRZI coding. 2·B1 correlation results are obtained from step b.

c. Correlation of the digital data with the third message fragment (having K3 known bits). To take into account possible stuffing bits in the second gap (the unknown bits between the second and the third fragment), the beginning of the correlation must be positioned at different distances from the second fragment. The number of unknown bits of the second gap is known (L2). The length of the second gap will therefore be L2 plus the number of stuffing bits. As the latter is unknown, different possible gap lengths have to be tried (L1, L1+1, . . . , L1+B2, where B2 is the maximum number of stuffing bits in a sequence of L2 bits). Each correlation has also to be carried out for the two possible phases in order to take into account the NRZI coding. 2·B2 correlation results are obtained from step c.

d. And so on.

e. If a parallel processing technique is adopted, the different correlation results have to be added up according to the possible combinations of the steps a., b., c. and d. The number of tested hypotheses therefore amounts to 2·(2·B1) (2·B2) . . .

f. A search is made among the tested hypotheses for that with the highest correlation peak (for the set of fragments). A positive detection moreover requires that the correlation peak exceed a certain analytically predefined threshold (with respect to the noise) that is empirically consolidated.

Instead of testing all the hypotheses (all the possible combinations), one may retain for the steps a., b., c and d., only the hypothesis that generated the highest correlation peak for each message fragment. There is a higher risk that this option may not arrive at the correct combination of fragments. To mitigate this disadvantage, in the course of progressing through the steps a., b., c. and d., one can retain a limited number of combinations having the highest correlation peaks and discard the other combinations.

Advantageously, the LEO satellite comprises a group of elementary antennae (forming a phased array antenna) which each receive the AIS signals. The digital data obtained by converting the signals received by the different antennae can then be combined to obtain an intended directivity of the group of antennae. In this case, the zone at sea level covered by the group of antennae can be artificially reduced, thereby reducing the number of AIS transmitters (and the number of colliding messages) to be considered at one time. In other words, the sensitivity of the antenna is increased for a certain geographical zone, whereas it is reduced outside this zone. The footprint of the group of antennae can then be swept by changing the phase relations between the different digital data flows. This frequency-selective technique (narrow frequency cells) enables the power of the interfering signals to be significantly reduced.

Figure 7:
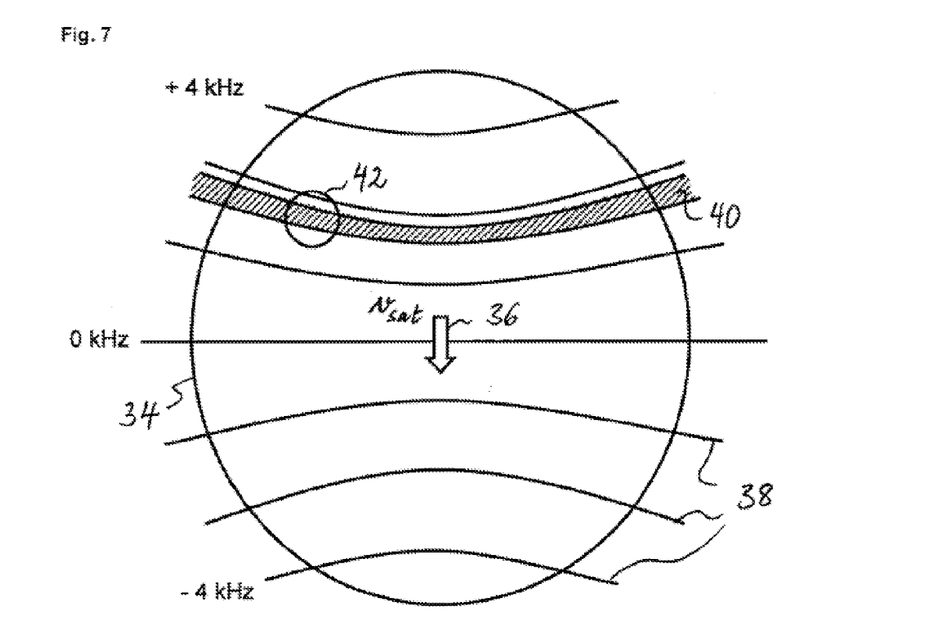
FIG. 7: is a schematic illustration of the footprint of a phased array antenna of a LEO satellite.

FIG. 7 shows schematically the footprint 34 of the group of antennae of the satellite. The satellite moves at a speed $v_{sat}$ (indicated by the arrow 36), which causes a Doppler shift of the AIS signals received by the satellite. The iso-Doppler lines are indicated by the reference number 38. The hatched band 40 corresponds to a cell of frequencies. The phased array antenna enables the detection zone to be reduced to a local zone 42 that is substantially smaller than the footprint 34. Attempts can then be made to detect the AIS messages from ships that as a result of their last position recorded in the database could be in this local zone 42. Inside the local zone 42, the scope of the Doppler shifts is clearly less with respect to the footprint 34, and therefore the number of frequency cells to be tested for each local zone 42 is considerably reduced.

Figure 8:
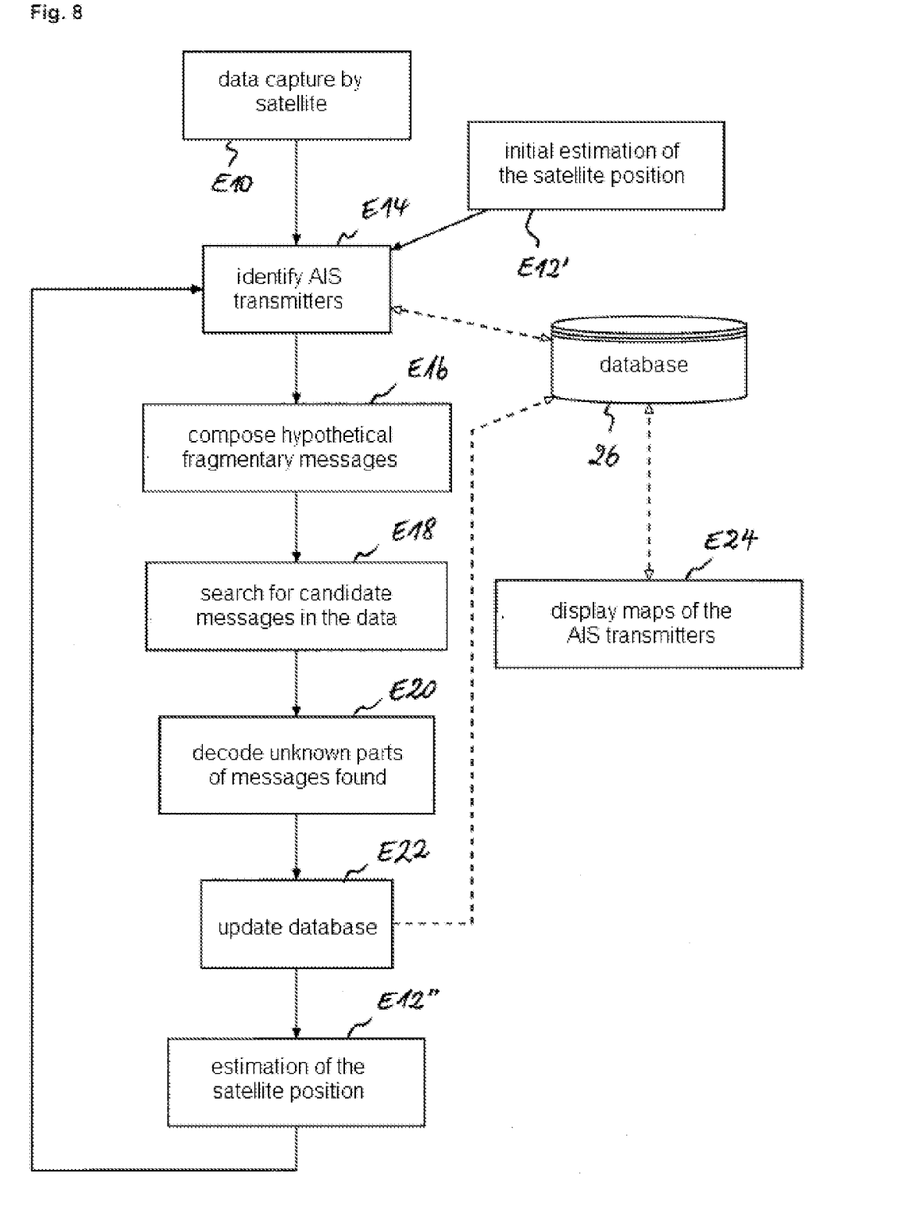
FIG. 8: is a schematic drawing illustrating the principles of a method of detection of AIS messages according to a second embodiment of the invention.

FIG. 8 shows the scheme of the principle for the inventive method according to a second preferred embodiment. The same reference number has been used to designate identical or similar steps with those of the method of the figure. As in the preceding example, data are collected at the level of the LEO satellite (step E10). The time stamped digital data are transmitted to the computer centre. The principal difference from the method of FIG. 3 resides in that the position of the satellite is obtained by triangulating the distances with respect to the positions of the transmitters, whose AIS messages are identified in the digital data. This variant of the invention is of interest if the LEO satellite is not equipped with a geopositioning system, if the system is faulty, or if the orbital data relating to the satellite are not communicated by the control centre.

To begin the method, those AIS transmitters are identified that could have transmitted an AIS message contained in the digital data (step E14). An initial estimation of the satellite position is preferably available (found in step E12') so as to be able to reduce the initial possibilities. If an initial estimation of the satellite position is not available, then one can attempt to detect a first AIS message in the digital data in a conventional manner (by using only the static part common to all the AIS messages for the correlation). Once the first AIS message has been decoded, the position of a first received AIS transmitter is known which can then be used as a rough estimate of the satellite position. Attempts are then made to find messages in the digital data from ships in the vicinity of the first transmitter that was found (by following the steps E16, E18 and E20 discussed above). Once at least four AIS messages (from different transmitters) have been detected, the satellite position can be estimated (step E12") by solving the following system of equations:

$$c \cdot T_A = |\vec{X}_{sat}(T_A) - \vec{X}_{\text{ème}\_A}| + c \cdot (T_{\text{émission}\_A\_UTC} - \delta_{sat\text{-}UTC}(T_A))$$

$$c \cdot T_B = |\vec{X}_{sat}(T_B) - \vec{X}_{\text{ème}\_B}| + c \cdot (T_{\text{émission}\_B\_UTC} - \delta_{sat\text{-}UTC}(T_B))$$

$$c \cdot T_C = |\vec{X}_{sat}(T_C) - \vec{X}_{\text{ème}\_C}| + c \cdot (T_{\text{émission}\_C\_UTC} - \delta_{sat\text{-}UTC}(T_C))$$

$$c \cdot T_D = |\vec{X}_{sat}(T_D) - \vec{X}_{\text{ème}\_D}| + c \cdot (T_{\text{émission}\_D\_UTC} - \delta_{sat\text{-}UTC}(T_D))$$

where $T_i$, $i = A, \ldots, D$, is the time of reception of the message from transmitter i in the satellite's time system (satellite clock), c is the speed of light, $\vec{X}_{sat}(T_i)$ is the position of the satellite a time $T_i$, $\vec{X}_{\text{ème}\_i}$ is the position of the transmitter i, $T_{\text{émission}\_i\_UTC}$ is the time of transmission of the message from the transmitter i in UTC time system and $\delta_{sat\text{-}UTC}(t)$ is the bias between the time referential of the satellite and the terms of reference UTC. The times $T_{\text{émission}\_i\_UTC}$ are known because the AIS frame is synchronised to the UTC time. The positions, $i = A, \ldots, D$, are known because the position of the ship is indicated in the AIS message. One can assume that the satellite clock is stable for the four measurements and therefore presents a constant bias with respect to UTC time and that the satellite position is the same for the times $T_i$, $i = A, \ldots, D$, with an error typically less than 100 m. Setting $T_m = \frac{1}{4}(T_A + T_B + T_C + T_D)$, gives:

$$c \cdot T_A = |\vec{X}_{sat}(T_m) - \vec{X}_{\text{ème}\_A}| + c \cdot (T_{\text{émission}\_A\_UTC} - \delta_{sat\text{-}UTC}(T_m))$$

$$c \cdot T_B = |\vec{X}_{sat}(T_m) - \vec{X}_{\text{ème}\_B}| + c \cdot (T_{\text{émission}\_B\_UTC} - \delta_{sat\text{-}UTC}(T_m))$$

$$c \cdot T_C = |\vec{X}_{sat}(T_m) - \vec{X}_{\text{ème}\_C}| + c \cdot (T_{\text{émission}\_C\_UTC} - \delta_{sat\text{-}UTC}(T_m))$$

$$c \cdot T_D = |\vec{X}_{sat}(T_m) - \vec{X}_{\text{ème}\_D}| + c \cdot (T_{\text{émission}\_D\_UTC} - \delta_{sat\text{-}UTC}(T_m))$$

This system can be solved for the unknowns $\vec{X}_{sat}(T_m)$ and $\delta_{sat\text{-}UTC}(T_m)$. By taking into account more than four messages, the position can be determined with greater accuracy. A least squares method is preferably used or a Kalman filter based on a mathematic model of the satellite orbit.

Having found the satellite position in this way, one can identify with a greater accuracy those AIS transmitters that could have transmitted a message received by the satellite and hence contained in the digital data. One can continue to search for messages in the already processed data and then in the digital data.

The database is updated as shown in the example of FIG. 3.

The invention claimed is:

1. A method for detecting automatic identification system (AIS) messages, the method comprising:
  providing digital data representing signals received by a satellite on at least one AIS channel;
  composing at least one hypothetical fragmentary message, the at least one hypothetical fragmentary message comprising bits from one or more static fields specific to a transmitter identified in a database of AIS transmitters;
  identifying a candidate message in the digital data by correlating the digital data with the at least one hypothetical fragmentary message;
  decoding the candidate message to produce a decoded message in response to the candidate message being identified in the digital data; and
  updating the database of AIS transmitters by utilizing information contained in the decoded message, wherein the at least one hypothetical fragmentary message comprises at least one AIS message fragment that is dependent on at least one of a transmission time and a transmitter position and that is determined with an assistance of the database of AIS transmitters.

2. The method according to claim 1, wherein the hypothetical fragmentary message comprises at least one AIS message fragment which is dependent on transmitter position and wherein the composing the at least one hypothetical fragmentary message includes:
  identifying, on the basis of the database of AIS transmitters, an AIS transmitter located in a zone served by the satellite when the signals are received;
  determining the at least one AIS message fragment which is dependent on transmitter position on the basis of a position, stored in the database, of the identified transmitter.

3. The method according to claim 2, wherein the at least one AIS message fragment which is dependent on transmitter position comprises most significant bits from a "longitude" field or most significant bits from a "latitude" field.

4. The method according to claim 1, wherein the digital data are time stamped, wherein the hypothetical fragmentary message comprises one or more AIS message fragments which is/are dependent on transmission time and wherein composing the hypothetical fragmentary message includes determining the at least one AIS message fragment which is dependent on transmission time on the basis of the time stamp of the digital data.

5. The method according to claim 4, wherein the at least one AIS message fragment which depends on transmission time comprises bits from a "time stamp" field or bits from "coordinated universal time (UTC) year", "UTC month", "UTC day", "UTC hour", "UTC minute" or "UTC second" fields.

6. The method according to claim 1, wherein the one or more static fields specific to the transmitter identified in the database comprise at least one of a "user identification (ID)" field, an "AIS version indicator" field, an "international maritime organization (IMO) number" field, a "call sign" field, a "name" field, a "type of ship and cargo type" field, an "overall dimension/reference for position" field and a "type of electronic position fixing device" field.

7. The method according to claim 1, wherein the hypothetical fragmentary message comprises bits from one or more dynamic fields specific to the transmitter identified in the database.

8. The method according to claim 7, wherein the one or more dynamic fields specific to the transmitter identified in the database comprise at least one of a "receiver autonomous integrity monitoring (RAIM) flag" field, a "special manoeuvre indicator" field, an "estimated time of arrival" field, a "current draught" field, a "destination" field, a "navigation status" field, a "course over ground" field, a "speed over ground" field and a "communication status" field.

9. The method according to claim 1, wherein the candidate message is identified by correlating the digital data with a plurality of hypothetical fragmentary messages, the correlations of the digital data with the plurality of hypothetical fragmentary messages being calculated in series or in parallel.

10. The method according to claim 9, wherein the hypothetical fragmentary messages are designed so as to test for presence or absence of stuffing bits in the candidate message.

11. The method according to claim 1, wherein the position of the satellite when the signals are received is estimated by triangulation relative to transmitters for which one or more AIS messages are identified in the digital data.

12. The method according to claim 1, wherein, for correlating the digital data with the hypothetical fragmentary message, the start of the hypothetical fragmentary message is synchronized with a start of a time interval of the AIS time frame.

13. The method according to claim 1, wherein, for correlating the digital data with the hypothetical fragmentary message, a calculated Doppler shift for the hypothetical fragmentary message is compensated as a function of transmitter position.

14. The method according to claim 13, wherein, for compensating the Doppler shift, account is taken of a transmitter carrier frequency error stored in the database.

15. The method according to claim 1, wherein, for correlating the digital data with the hypothetical fragmentary message, account is taken of a transmitter modulation index stored in the database.

16. The non-transitory data storage medium having computer-executable instructions for detecting automatic identification system (AIS) messages stored therein, which, when executed by a computer, cause the computer to:
compose at least one hypothetical fragmentary message, the at least one hypothetical fragmentary message comprising bits from one or more static fields specific to a transmitter identified in a database of AIS transmitters; and
identify a candidate message in digital data, the digital data representing signals received by a satellite on at least one AIS channel, the identifying of a candidate message comprising correlating the digital data with the at least one hypothetical fragmentary message;
decoding the candidate message to produce a decoded message in response to the candidate message being identified in the digital data; and
updating the database of AIS transmitters by utilizing information contained in the decoded message, the hypothetical fragmentary message comprising at least one AIS message fragment that is dependent on at least one of a transmission time and a transmitter position and that is determined with an assistance of the database of AIS transmitters.

\* \* \* \* \*